United States Patent
Fukuhara et al.

(10) Patent No.: US 6,728,908 B1
(45) Date of Patent: Apr. 27, 2004

(54) I2C BUS PROTOCOL CONTROLLER WITH FAULT TOLERANCE

(75) Inventors: Ryan Fukuhara, Torrance, CA (US); Leonard Day, Pasadena, CA (US); Huy H. Luong, San Marino, CA (US); Robert Rasmussen, Monrovia, CA (US); Savio N. Chau, Hacienda Heights, CA (US)

(73) Assignee: California Institute of Technology, Pasadena, CA (US)

( * ) Notice: Subject to any disclaimer, the term of this patent is extended or adjusted under 35 U.S.C. 154(b) by 463 days.

(21) Appl. No.: 09/717,800

(22) Filed: Nov. 20, 2000

Related U.S. Application Data

(60) Provisional application No. 60/166,520, filed on Nov. 18, 1999.

(51) Int. Cl.[7] ................................................ G06F 11/00
(52) U.S. Cl. ............................. 714/48; 714/43; 716/4
(58) Field of Search ............................ 714/43, 48, 55; 716/4

(56) References Cited

U.S. PATENT DOCUMENTS

| | | | | |
|---|---|---|---|---|
| 5,201,054 A | * | 4/1993 | Dudhela ................... | 709/230 |
| 5,694,542 A | * | 12/1997 | Kopetz ..................... | 714/49 |
| 6,088,826 A | * | 7/2000 | Teich ....................... | 714/774 |
| 6,154,803 A | * | 11/2000 | Pontius et al. ............ | 710/310 |
| 6,233,635 B1 | * | 5/2001 | Son ......................... | 710/315 |
| 6,513,131 B1 | * | 1/2003 | Kanekawa et al. ........ | 714/11 |

OTHER PUBLICATIONS

Phillips Semiconductor, "The I²C-bus and how to use it (including specifications)", pp. 1–24, 4/95.

* cited by examiner

Primary Examiner—Robert Beausoliel
Assistant Examiner—Emerson Puente
(74) Attorney, Agent, or Firm—Fish & Richardson P.C.

(57) ABSTRACT

In an embodiment, a bus controller for connecting a device to an Inter-Integrated Circuit (I2C) bus includes fault tolerance features. The I2C bus controller may support fail silent, cyclic redundancy check (CRC), and byte count check operations. The I2C bus controller may include a control unit connected to an I2C core module having a base address. The I2C bus controller may also include a second I2C core module having a base address plus one (BP1). The I2C bus controller may also include a mute timer that countdowns a mute timeout period. This mute timer may be reset upon receiving a fail silent test message sent by a master on the I2C bus in slave mode, or, in the master mode, from itself through the BP1 I2C core module. If the mute timeout period expires, the control unit may disable the I2C bus controller from transmitting on the I2C bus. The control unit may format CRC values and byte count values into messages, and include a byte counter to compare actual bytes received to the expected byte count indicated by a received byte count value.

18 Claims, 3 Drawing Sheets

I2C BUS PROTOCOL CONTROLLER WITH FAULT TOLERANCE

CROSS-REFERENCE TO RELATED APPLICATION

This application claims priority to U.S. Provisional Patent Application Ser. No. 60/166,520, filed on Nov. 18, 1999, which is hereby incorporated by reference.

ORIGIN OF INVENTION

The invention described herein was made in the performance of work under a NASA contract, and is subject to the provisions of Public Law 96-517 (35 U.S.C. 202) in which the Contractor has elected to retain title.

BACKGROUND

I2C is a bus developed by Philips Semiconductors to connect integrated circuits (ICs). The standard I2C bus may operate as a multi-master bus: Multiple ICs may be connected to the I2C bus and each one may act as a master by initiating a data transfer. Serial 8-bit oriented, bi-directional data transfers may be made at up to 100 kbit/s in a standard mode or up to 400 kbit/s in a fast mode. The I2C bus may include two bus lines, a serial data line (SDL) and a serial clock line (SCL).

The standard I2C bus protocol does not provide certain fault tolerance features. It may be desirable to include an I2C bus controller that may handle such fault tolerance features in ICs connected to an I2C bus. These fault tolerance features may prevent certain errors and faults from interfering with operation of the I2C bus. ICs including such an I2C bus controller may be used in the development and production of systems that require fault tolerance, such as aeronautic and astronautic systems.

SUMMARY

In an embodiment, a bus controller for connecting a device to an Inter-Integrated Circuit (I2C) bus includes fault tolerance features. The I2C bus controller may support fail silent, data transmission error detection, e.g., cyclic redundancy check (CRC), and byte count check operations.

The I2C bus controller may include a control unit connected to an I2C core module having a base address, and glue logic to connect the two components. The I2C bus controller may also include a second I2C core module having a base address plus one (BP1), that is, the next available address. The I2C bus controller may also include a mute timer that countdowns a mute timeout period. This mute timer may be reset upon receiving a fail silent test message sent by a master on the I2C bus in slave mode, or in the master mode, from itself through the BP1 I2C core module. If the mute timeout period expires, the control unit may disable the I2C bus controller from transmitting on the I2C bus. The I2C bus controller may include an unmute timer. In the master mode, the unmute timer may be triggered to countdown an unmute timeout period at the expiration of the mute timeout period. When the timeout period expires, the control unit may re-enable transmission on the I2C bus.

The control unit may format CRC values and byte count values into messages. The I2C bus controller may include a byte counter to compare actual bytes received to the expected byte count indicated by a received byte count value.

The I2C bus controller may interact with nodes on the I2C bus that support the fault tolerance features and with nodes that do not support the fault tolerance features.

The details of one or more embodiments of the invention are set forth in the accompanying drawings and the description below. Other features, objects, and advantages of the invention will be apparent from the description and drawings, and from the claims.

DETAILED DESCRIPTION

A digital system that may be incorporated into an integrated circuit (IC) to enable the IC to interact with an Inter-IC (I2C) bus may be distributed as a commercial off-the-shelf (COTS) I2C intellectual property (IP) core module. The I2C core module may be described in a hardware description language such as Verilog or VHDL.

Figure 1:
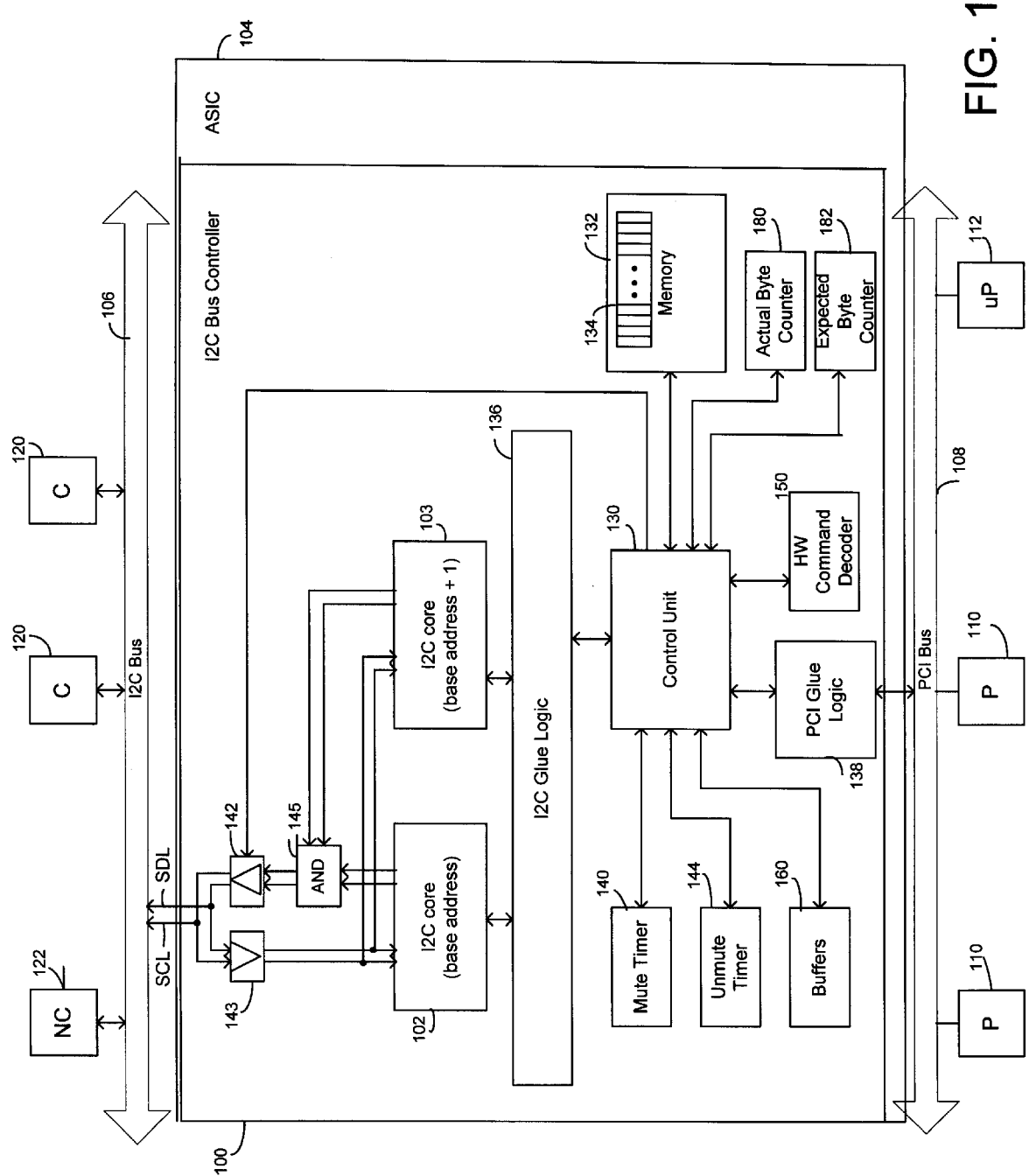
FIG. 1 as a block diagram of a system including devices with an I2C bus controller according to an embodiment.

An I2C bus controller 100 according to an embodiment may provide fault tolerance features to a component I2C core module 102 that are not available under the standard I2C bus protocol. The I2C bus controller 100 may be incorporated into an Application Specific Integrated Circuit (ASIC) 104 that may be connected to an I2C bus 106 and a Peripheral Component Interconnect (PCI) bus 108, as shown in FIG. 1. The I2C bus controller 100 may be described in a hardware description language such as Verilog or VHDL.

The PCI bus is a local bus standard developed by Intel Corporation. The PCI bus may connect devices, such as the ASIC 104 and other peripheral components 110 directly, or almost directly, to a host microprocessor 112. The I2C bus controller may handle communication between the ASIC 104 and other I2C nodes 120, 122, and between the ASIC 104 and the PCI bus 108.

According to an embodiment, the I2C bus controller 100 may incorporate one or two commercial off-the-shelf (COTS) I2C core modules 102, 103 and additional structure and instructions to provide fault tolerance features to protect the I2C bus 106 from bit errors and babbling nodes, i.e., nodes that misbehave or otherwise disrupt normal communications. The I2C bus controller 100 may provide additional features such as tracking the number of bytes transmitted in a data transfer and discrete input/output (I/O) control. Such features may be advantageous in aeronautic and astronautic applications.

The I2C bus controller 100 may include a control unit 130 that may perform hardware and software operations. The control unit may be connected to a memory 132 that may include instructions, data, addresses, and registers 134. The registers 134 may be mapped into PCI memory space.

The control unit 130 may interface the I2C core modules 102, 103 through an I2C glue logic module 136 and may interface the PCI bus 108 through a PCI glue logic module 138.

Nodes on the I2C bus may operate as masters or slaves. A master may initiate and terminate a data transfer. A slave is addressed by a master. Masters and slaves may operate as either transmitters or receivers. Thus there are four transfer modes for a node: master-transmitter; master-receiver; slave-transmitter; and slave receiver. The ASIC 104 including the I2C bus controller 100 may operate as a master or a slave.

It may be desirable to include nodes on the I2C bus that do not support some or all of the additional features of the I2C bus controller of an embodiment. Such nodes, including many COTS units, may be useful in developing and testing a system. Nodes that are I2C compatible, but do not support some or all of the fault tolerance features provided by the I2C bus controller 100 are hereinafter referred to as non-compliant nodes 122 and other nodes on the I2C bus 106 that include an I2C bus controller 100 are hereinafter referred to as compliant nodes 120. Non-compliant nodes 122 may be limited to acting as slaves.

Compliant nodes 120 on the I2C bus 106, including the ASIC 104, may act as fail silent nodes. A fail silent node is a self-checking node that operates correctly or stops functioning after an internal failure is detected. According to an embodiment, the I2C bus may operate as a single master bus. The master, for example, ASIC 104, may periodically issue a fail silent test message to all nodes on the I2C bus, including itself. The ASIC 104 and other compliant nodes on the I2C bus may include a mute timer 140. The mute timers 140 may be programmed to have a particular time out period, for example, three seconds. The mute timer 140 in each node is reset when the node receives the fail silent test message from the master. If the mute timer times out before the fail silent test message is received from the master, the I2C transmitter 142 in the node may be electrically disabled (muted) and the node placed in an idle state. Thus, if a babbling node monopolizes the bus for longer than the time out period, in this case three seconds, the master would be unable to transmit the fail silent test message to the babbling node within the time out period. When the babbling node's mute timer expires, the node may be placed in the idle state, thereby freeing the bus for future data transfers.

As described above, the master may send the fail safe test message to itself. The standard I2C protocol does not support self addressing. To circumvent this limitation, the I2C bus controller 100 may include two I2C core modules. The I2C core module 102 is provided with a base address and the I2C core module 103 with another address. The I2C core module 103, and hence the I2C bus controller 100, may thereby receive the fail silent test message like other slave nodes on the I2C bus 106. According to an embodiment, the I2C core module has an address of the base address plus one (BP1)(the next available address space), but may have other addresses in alternate embodiments.

The I2C core module 102 and BP1 I2C core module 103 may communicate with the I2C bus 106 through a transmitter 142 and a receiver 143. The data and clock transmit lines of the I2C core module 102 and the BP1 I2C core module 103 may be input to AND gate 145. When the ASIC 104 operates as the master, the BP1 I2C core module 103 may be enabled. The master may send the fail silent test message to itself by addressing the BP1 I2C core module 103.

The BP1 I2C core module 103 may only operate as a slave and receive messages. The BP1 I2C core module 103 may not transmit acknowledgements in the fail silent mode.

The master may also include a mute timer 140. In the case of the babbling node described above, the master may be prevented from transmitting the fail silent test message from the I2C core module 102 to the BP1 I2C core module 103, and the master mute timer 140 may expire. When the master mute timer 140 expires, the control unit 130 may turn off the transmission driver 142 and place the ASIC 104 in the idle state.

Once all nodes, including the master, are in the idle state, the I2C bus 106 may be silent. The master (ASIC 104) may self-unmute after a period of silence without software intervention. The ASIC 104 may include an unmute timer 144 that may be triggered to countdown a programmable timeout period when the mute timer 140 expires after a fail silent condition occurs. When the unmute timeout period expires, the transmitter 142 may be re-enabled and the mute timer 140 reinitialized. The control unit 130 may take the ASIC 104 out of the idle state, and the master may initiate another data transfer on the I2C bus 106.

The delay values for the mute timer 140 and the unmute timer 144 may be stored in a mute value (mute_val) register and an unmute value (unmute_val) register, respectively. The timer widths may be twenty-four bits, allowing a maximum delay of about 14 seconds for 100 KHz operation and about 3.5 seconds for 400 KHz operation.

The ASIC 104 may also act as a slave. In the slave operating mode, the BP1 I2C core module 103 and the unmute timer 144 may be disabled, since only the master mode may self-unmute.

The I2C bus controller 100 may issue hardware commands in the master transmit operating mode.

The reset hardware command resets a node.

The fail silent test command is used as a periodic bus integrity check. Upon decoding the message, the slave reinitializes the mute timer 140 with the mute timeout value. The ASIC 104 and other compliant slave nodes 120 may decode this command using a hardware command decoder 150.

The mute command produces a forced mute of the selected node. Upon execution, the node is electrically disconnected from the I2C bus 106 and the mute timer 140 disabled. The I2C controller 100 state machines and I2C core modules 102, 103 may be reset. If the BP1 I2C core module 103 is enabled, then the unmute timer 142 may be enabled to count. A maskable mute interrupt may be asserted upon entering the mute condition.

The disable fail silent muter timer command disables the fail silent mute timer 140. The mute timer 140 defaults to enabled upon power up. The ASIC 104 and other compliant slaves nodes 120 may decode this command.

The unmute hardware command enables and reinitializes the fail silent mute timer 140. The node's transmitters 142 are also enabled. The ASIC 104 and other compliant slave nodes 120 may decode this command. A maskable unmute interrupt may be generated upon entering the unmute condition.

Figure 2:
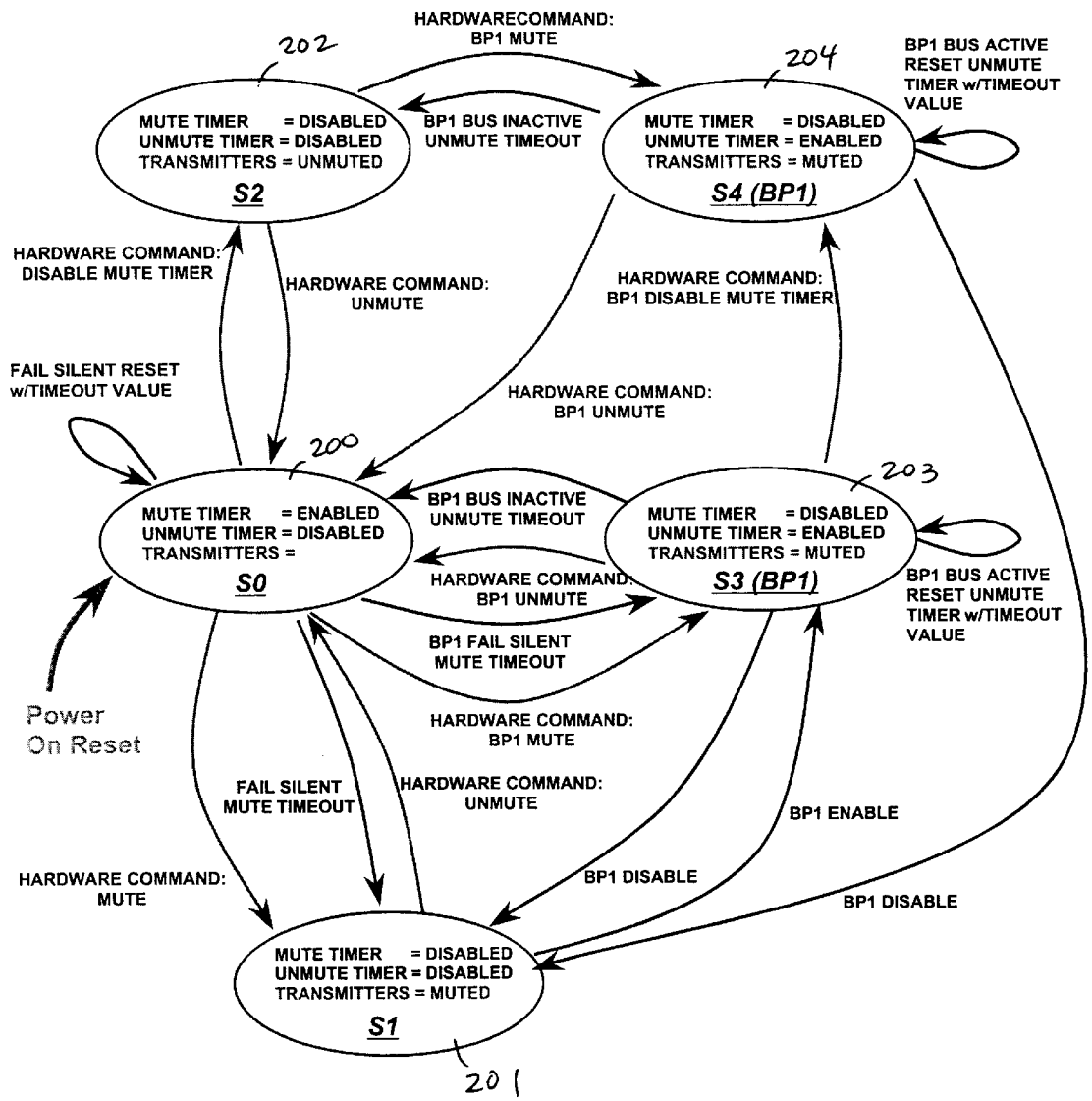
FIG. 2 is a state diagram describing states the I2C bus controller may enter in a fail silent operation according to an embodiment.

FIG. 2 illustrates a state diagram for the I2C bus controller 100 and I2C core modules 102, 103. State 200 (S0), state 201 (S1), and state 202 (S2) may be entered in either the master operating mode or slave operating mode, in which the BP1 I2C core module 103 is disabled. State 203 (S3) and state 204 (S4) may be entered in the master operating mode, in which the BP1 I2C core module 103 is enabled.

According to an embodiment, a software reset may not re-enable (unmute) the transmitters. After power on reset, the mute timers 140 and transmitters 142 of the nodes may be enabled, and the unmute timer 144 armed to count. A hardware command mute timer enable message may re-enable the mute timer and the transmitter and reinitialize the unmute timer 144.

Figure 3:
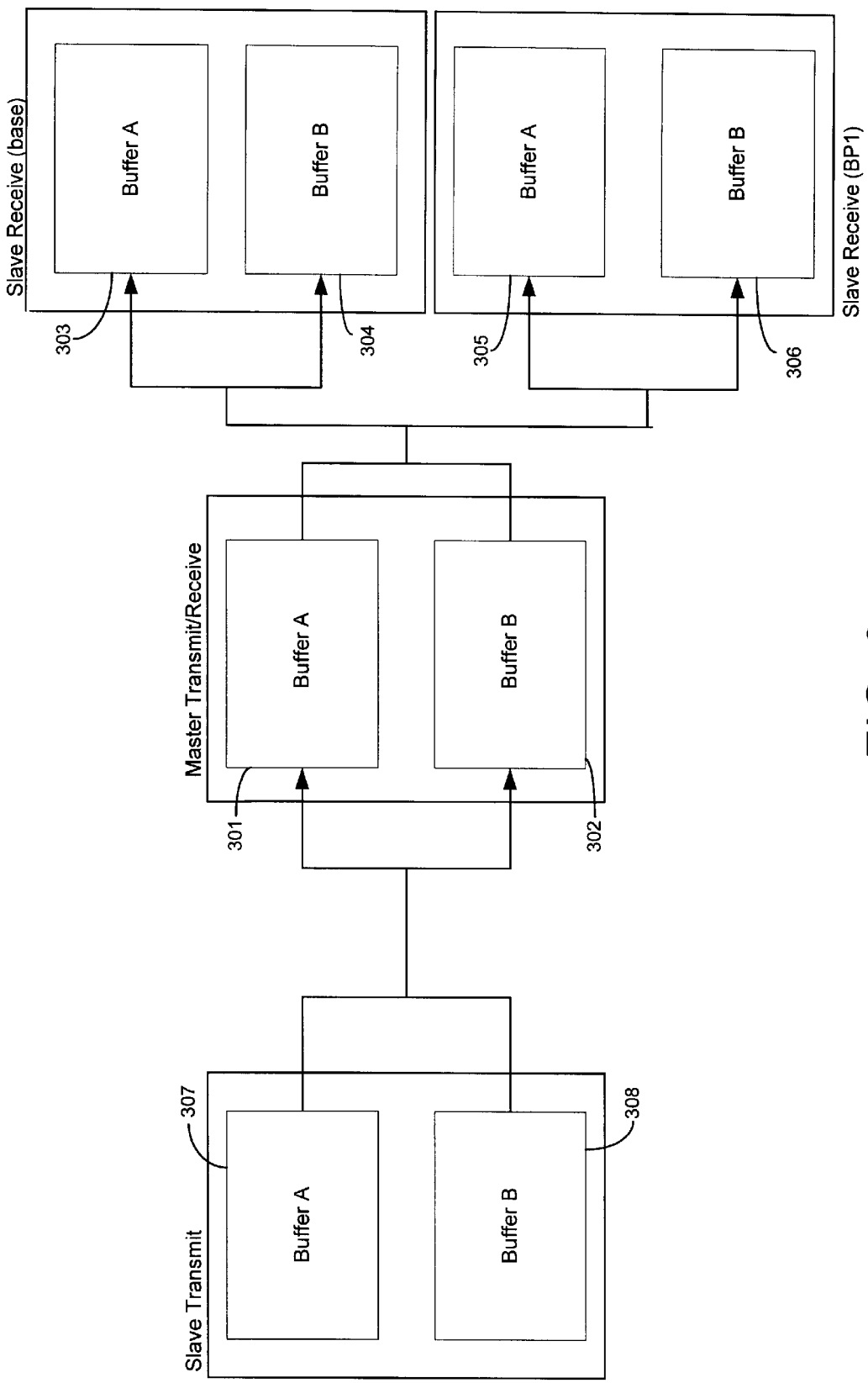
FIG. 3 is a more detailed block diagram of the buffers of the I2C bus controller of FIG. 1.

FIG. 3 illustrates the buffers 160 of FIG. 1 in greater detail. The buffers 160 may include two master transmit/receive buffers, buffer-A 301 an buffer-B 302, two slave receive buffers, buffer-A 303 and buffer-B 304, for the I2C core module 102, and two slave receive buffers, buffer-A 305 and buffer-B 306, for the BP1 I2C core module 103, and two slave transmit buffers, buffer-A 307 and buffer-B 308. The buffers 160 may be store-and-forward based, where only one message resides in each buffer at a time. Separate master and slave buffers may be implemented for concurrent master and slave operations. An exemplary buffer may be sixty-four locations deep by thirty-two bits wide. Slave address, byte count, hardware command bytes and bytes used for data transmission error detection may be stored separately from the buffers. Therefore each buffer may store up to 255 bytes of data.

The data buffers may be memory mapped to a PCI address and may be randomly accessed through the PCI bus 108. Slave receive buffer writes may not normally be writable through the PCI port 170 (FIG. 1) by default. For test purposes, PCI write access to the slave receive buffers 303–306 may be achieved by setting a receive buffer write enable rvbufwren bit. However, when this bit is set, I2C write access to the slave receive buffers 303–306 may be disabled. Therefore, the rvbfwren bit may be cleared before reverting to I2C receive operations. Slave receive buffers may be read through the PCI port 170 regardless of the state of the rvbufwren bit.

The two buffers 301, 302 may be dedicated to master transmit and receive operations. Master transmit and master receive operations may be exclusive to each other and thus share the same buffers. Each buffer may have a corresponding remote slave address register (mas_bufa_slv_adr and mas_bufb_slv_adr) and message byte count register (mas_bufa_msg_size and mas_bufb_msg_size).

To initiate a master operation, software sets the appropriate master-buffer-go bit(s) (mas_bufa_go or mas_bufb_go) associated with the buffer. When the transaction is complete, hardware may set the appropriate master-buffer-operation-done bit(s) (mas_bufa_op_done or mas_bufb_op_done).

Each buffer may have an associated 32-bit time stamp register. The transmit buffer and transmit hardware command time stamp registers may be loaded with the current relative time after the I2C core module 102 has been loaded with the last transmit cyclic redundancy (CRC) byte, or last byte in the non-compliant mode. The receive buffer and receive hardware command time stamp registers may be loaded with the current relative time after receipt of the last CRC byte, or last byte in the non-compliant mode. The time stamp values may be valid when the following respective interrupt status bits are set: bp1_bufa_gcm, bp1_bufb_gcm, bp1_bufa_msg, bp1_bufb_msg, mas_bufa_op_done, mas_bufb_op_done, rrs_bufa_sent, rrs_bufb_sent, rv_bufa_gcm, rv_bufb_gcm, rv_bufa_msg, rv_bufb_msg, rv_hw_cmd.

In a master transmit mode, the I2C bus controller 100 transfers data to a slave node. After initializing the buffer configuration bits, byte count and remote slave address registers, software may write a complete message into one buffer and set the appropriate master-buffer-go register bit associated with the buffer. In response to detecting the set bit, hardware may transmit the message. The master-buffer-go bit may be cleared by hardware after the message is sent to the slave. Software may concurrently write the second transmit buffer while hardware transmits the first message.

Hardware may track the sequence in which the master-buffer-go bits are set in the event both bits are set before the start of buffer access. The message in the buffer containing the first master-buffer-go bit set is transmitted first. Software may monitor whether a master receive operation is in progress or pending before setting the master-buffer-go bits. After hardware detects that the master-buffer-go bit is set, hardware arbitrates for the I2C bus 106 and may assert a start condition if the bus 106 is free. The slave address and read/write bit are sent first. The I2C bus controller 100 may wait for an acknowledgement from the slave I2C device before transmitting the message. The I2C bus controller 100 may not wait for an acknowledgement when sending a hardware command message.

If an acknowledgement is received, the succeeding bytes in the respective master transmit message format are transmitted. The appropriate master-buffer-operation-done bit may be set after the operation is complete.

If the configuration buffer bits indicate a compliant message type, the expected transmit byte count from the appropriate master-buffer-message-size register may be loaded by hardware into an internal actual transmit byte counter 180 (FIG. 1) and transmitted to the compliant slave 120. After the byte count is acknowledged by the slave, the data bytes are transmitted each with a corresponding slave acknowledge. The slave acknowledgment increments the internal actual byte counter 180. When the actual byte count equals the expected byte count, the error dectection bytes may be transmitted, least significant byte first.

Cycle redundancy check (CRC) is a technique for detecting data transmission errors. The CRC may be generated by hardware during transmission and regenerated during receive. The CRC may be calculated across the slave address, byte count and data bytes with the CRC-16 polynomial, $X^{16}+X^{15}+X^2+1$. The initial seed value according to an embodiment is 51,637 (c9b5 hex). The CRC algorithm used may be a parallel table driven and non-reflective. A quick check to determine whether an independently implemented CRC generator algorithm matches the compliant CRC algorithm follows: For the input sequence (in hexadecimal) of 31h, 32h, 33h, 34h, 35h, 36h, 37h, 38h, 39h, and assuming the seed is 00h, the CRC should be fee8h. For a seed of c9b5 and with the same input sequence, the CRC should be 3000h. A seed of 9c4ah may be used with a serial CRC algorithm to match the parallel table driven algorithm seed of c9b5h.

Alternate embodiment may use alternate types of error detection. For example, other CRC algorithms or other error detection schemes, such as checksum, parity, Hamming code, etc., may be used.

A CRC-16 value may be accumulated for each byte of the message including the slave address and byte count. The I2C bus controller 100 may end the transmission by generating an I2C stop condition after the CRC bytes are sent and acknowledged. The value of the internal actual transmit byte counter 180 may be saved in the master-buffer-byte-counter register (mas_bufa_byte_count or mas_bufb_byte_count) for software inspection. The I2C bus controller may then set the appropriate master-buffer-done bit, clear the appropriate master-buffer-go bit, generate an interrupt, and return to idle.

An exemplary master transmit message format is shown in Table 1.

TABLE 1

Master Transmit Message Format (Compliant)

| Transmitter | Data Location | Byte # | b7 | b6 | b5 | b4 | b3 | b2 | b1 | b0 |
|---|---|---|---|---|---|---|---|---|---|---|
| Master | slave addr reg | 0 | Slave Address | | | | | | | 0 |
| Master | byte count reg | 1 | Byte Count (non-zero) | | | | | | | |
| Master | buffer | 2 | Data 0 | | | | | | | |
| Master | buffer | 3 | Data 1 | | | | | | | |
| Master | buffer | : | : | | | | | | | |
| Master | buffer | k-3 | Data n-1 | | | | | | | |
| Master | hw encoded | k-2 | CRC (lsb) | | | | | | | |
| Master | hw encoded | k-1 | CRC (msb) | | | | | | | |

The first byte transmitted by the I2C bus controller in the master transmit operating mode includes a seven-bit slave address and a read/write bit. The address may be decoded by each slave node 120, 122 to determine if it is the target. The read/write bit may be set to zero to indicate a master write to slave receive operation. A non-zero byte count with a value "n" may be transmitted after the slave address. N-bytes may then be transmitted, followed by the two-byte CRC value.

A message transmitted to a non-compliant slave node may be formatted like a compliant message with the following exceptions: the byte count and CRC bytes may not be transmitted to the slave; and a stop condition may be asserted after the last data byte has been transmitted and acknowledged.

Hardware command messages may be transmitted by the I2C bus controller 100 in the master transmit operating mode when a hard-wired hardware command enable bit is enabled, a soft register hardware command enable bit is enabledy and the value of the expected data-message-size register value is zero. Hardware command messages may be transmitted in a manner similar to compliant messages described above with the exception that hardware command header bytes are transmitted instead of buffer data. Non-acknowledgements may be reported to the host processor 112, but do not abort the message. A subset of hardware commands may be executed locally through the PCI port 170. Table 2 is a list of exemplary local executable hardware commands for both master transmit and PCI local access.

TABLE 2

| Byte Value (hex) | Action | Affected Discrete I/O Bit | Slave Ack? | PCI Access ? |
|---|---|---|---|---|
| 03 | Commanded reset. Reset will clear and put the ASIC in a known state. Also, it will reset the flight processor/micro-controller. | N/A | YES | YES |
| 05 | Fail silent message test command, reinitializes mute timer with register R1 timeout value. | N/A | YES | NO |
| 06 | Mute I2C transmitters. | N/A | YES | NO |
| 09 | Disable fail silent mute timer. Slave acknowledges if not muted, does not acknowledge if muted. | N/A | — | NO |
| 0a | Unmute I2C transmitters. Enable fail silent mute timer and reinitializes mute timer with register R1 timeout value. No slave acknowledgement, slave is electrically disconnected. | N/A | NO | NO |

TABLE 2-continued

| Byte Value (hex) | Action | Affected Discrete I/O Bit | Slave Ack? | PCI Access ? |
|---|---|---|---|---|
| 21 | Deassert bit. | disc_out1 | YES | YES |
| 22 | Deassert bit. | disc_out2 | YES | YES |
| 24 | Deassert bit. | disc_out3 | YES | YES |
| 27 | Deassert bit. | disc_out4 | YES | YES |
| 28 | Deassert bit. | disc_out5 | YES | YES |
| 2b | Deassert bit. | disc_out6 | YES | YES |
| 2d | Deassert bit. | disc_out7 | YES | YES |
| 90 | Assert bit. | disc_out1 | YES | YES |
| 93 | Assert bit. | disc_out2 | YES | YES |
| 95 | Assert bit. | disc_out3 | YES | YES |
| 96 | Assert bit. | disc_out4 | YES | YES |
| 99 | Assert bit. | disc_out5 | YES | YES |
| 9a | Assert bit. | disc_out6 | YES | YES |
| 9c | Assert bit. | disc_out7 | YES | YES |

An embodiment includes seven separate hardware commands to set discrete input/output (I/O) bits. Conversely, there are seven separate hardware commands to clear individual discrete I/O bits. Once set or cleared, the seven discrete I/O bits remain in that state until changed with the respective set/reset discrete I/O hardware command. All discrete I/O bits may set upon power-on-reset. Soft resets may not affect the states of the discrete I/O bits.

The discrete I/O bits are controllable through I2C hardware command messages (slave mode only) and through PCI writes to the hardware-command register (hw_cmd) and ones complemented hardware command register (hw_cmd_not). PCI access to the discrete bits may be enabled only if both the soft register PCI hardware command enable (pci_hw_cmd_enable) bit the I/O hardware command enable (iohwcmd_en) bit are asserted. If either of these two enable signals are not asserted, the hardware command may not be executed. After the hardware command registers are loaded, the PCI hardware command execute bit (pci_hw_cmd_ex) may be set to enable the changing of the discrete bit states. The pci_hw_cmd_enable bit is cleared after the pci_hw_cmd_ex bit is set.

Hardware commands through the PCI may not be executed unless the command is valid, both registers are written with the correct values, and both pci_hw_cmd_enable and iohwcm_en bits are asserted.

Priority may be given to PCI access in the event the slave is in the process of receiving an I2C hardware command and a PCI hardware command write occurs. If a PCI hardware command write is executed successfully, a hardware command done bit (hw_cmd_done) may be set and a maskable interrupt generated.

Local hardware commands are enabled if the node is compliant, the hard-wired hardware command enable bit is enabled, and the soft register bit for PCI hardware command enable status (pci_hw_cmd_enable) is set.

The hardware command message is a master transmit message with the byte count set to zero. The message format may have a fixed length of six bytes including slave address and read/write bit, zero byte count, hardware command (and ones complemented) bytes and CRC bytes. Table 3 illustrates an exemplary compliant hardware message format.

TABLE 3

Hardware Command Message Format (Compliant)

| Transmitter | Data Location | Byte # | b7 | b6 | b5 | b4 | b3 | b2 | b1 | b0 |
|---|---|---|---|---|---|---|---|---|---|---|
| Master | slave addr reg | 0 | | | | Slave Address | | | | 0 |
| Master | byte count reg | 1 | | | | Zero Byte Count (00h) | | | | |
| Master | hw cmd xmit reg | 2 | | | | Hardware Command | | | | |
| Master | hw cmd xmit reg | 3 | | | | One's Complement Hardware Command | | | | |
| Master | hw encoded | 4 | | | | CRC (lsb) | | | | |
| Master | hw encoded | 5 | | | | CRC (msb) | | | | |

Hardware command messages, other than the unmute command, are acknowledged by the compliant slave receiver. The unmute command is excepted because the unmute hardware command may be transmitted only when the target slave's transmitter is electrically disconnected due to a fail silent condition. Internally, the slave will acknowledge, but the acknowledge will not reach the master because of the disconnected transmitter 142.

Non-compliant slave receivers 122 may not be capable of decoding hardware command messages.

The bit pattern for each hardware command may have a Hamming spacing of two, i.e., each bit pattern differs each of the others by at least two bit positions. An exemplary algorithm for choosing valid patterns follows: (1) Toss out all zeros and all ones pattern; (2) sum the number of ones across the 8-bit pattern; take the modulus 2 of the sum; (3) if the modulus operation returns zero, i.e., zero ones or even number of ones, then the pattern differs by at least two bits.

A general call message is a master transmit broadcast to compliant nodes 120. A general call message may be identified by a slave address of zero. Bit-0 of byte one determines the general call message type, as defined by the I2C specifications, and is set to one. If the bit is set to zero, the slave ignores the general call message beyond byte one and responds with a non-acknowledge.

In the non-compliant mode, the master may transmit the general call message without the master address, expected data byte count, or CRC bytes. After receipt of a general call, the master address may be stored in either a receive buffer 302 general call message (rv_bufa_gcma) register or a receive buffer 303 general call message (rv_bufb_gcma) register of the slave.

Table 4 illustrates an exemplary general call message format.

TABLE 4

General Call Message Format (Compliant)

| Transmitter | Data Location | Byte # | b7 | b6 | b5 | b4 | b3 | b2 | b1 | b0 |
|---|---|---|---|---|---|---|---|---|---|---|
| Master | slave addr reg | 0 | | | | Zero Slave Address (00h) | | | | 0 |
| Master | Hw encoded | 1 | | | | Master Address | | | | 1 |
| Master | Byte count reg | 2 | | | | Data Byte Count n | | | | |
| Master | buffer | 3 | | | | Data 0 | | | | |
| Master | buffer | 4 | | | | Data 1 | | | | |
| Master | buffer | : | | | | : | | | | |
| Master | buffer | k-3 | | | | Data n-1 | | | | |

TABLE 4-continued

General Call Message Format (Compliant)

| Transmitter | Data Location | Byte # | b7 | b6 | b5 | b4 | b3 | b2 | b1 | b0 |
|---|---|---|---|---|---|---|---|---|---|---|
| Master | Hw encoded | k-2 | | | | CRC (lsb) | | | | |
| Master | Hw encoded | k-1 | | | | CRC (msb) | | | | |

At reset or soft reset, the general call enable (gen_call_en) bit and BP1 general call enable (bp1gen_call_en) bit may be set and the I2C core register 102 initialized by the I2C bus controller 100. General call response may be disabled and re-enabled by clearing or setting the respective bits. If the I2C bus controller 100 is busy servicing the I2C bus 106, then the general call enable bits may not be written to the I2C cores until the respective I2C core module 102 or BP1 I2C core module 103 becomes idle.

The coreregwr register bits remain asserted until the general call enable bits are written into the I2C core module registers. The I2C bus controller 100 sets the respective rv_bufa_gcm, rv_bufb_gcm, bp1_bufa_gcm, bp1_bufb_gcm bits after reception of a general call message and generates an interrupt. If there is a CRC error in the general call message, the appropriate bits, i.e., rv_bufa_crc_fail, rv_bufb_crc_fail, bp1_bufa_crc_fail and bp1_bufb_crc_fail, may be set.

A master may start a transfer only if the bus is free. During times of no data transfer, both the clock line (SCL) and data line (SDL) are pulled high through external pull-up resistors. To transmit data the bus master transmits the start condition which is defined as a high to low transition on the SDA line when the SCL is high.

Arbitration may be lost anywhere during the message transmission after an I2C start condition. If arbitration is lost after the slave address is transmitted but before the data is transmitted, excluding receiving a general call or its own slave address, the I2C bus controller 100 may wait until the I2C bus 106 is clear and re-arbitrate for the bus. If arbitration is lost after the slave address is transmitted and the I2C bus controller 100 detects its own slave address from a general call message, the I2C bus controller 100 in master transmit operation mode may switch to slave mode. The transmit read pointer may be reset and the transmit byte counter reinitialized to facilitate transmitting the message later.

After returning to the idle state from slave mode, the I2C bus controller 100 may restart its master transmit operation. Hardware may track which buffer was queued for transmit before the slave operation in order to resolve which buffer to transmit in the event both master-buffer-go bits are set upon returning from a slave operation. The arbitration retry count may be contained in a re-arbitration count register.

In the master transmit operating mode, the I2C bus controller 100 may handle errors such as non-acknowledgement and master operation abort. For these error handling cases, the value of the internal actual byte counter may saved in the master-buffer-byte-counter register for software inspection.

If an acknowledge is not received after an address or data byte is transmitted, then an I2C stop condition is generated and the appropriate "no acknowledge" bit (mas_bufa_noack or mas_bufb_noack) may be set. The master-buffer-go bit may be cleared, an interrupt generated, and the I2C bus controller 100 may return to idle. The only exception are non-acknowledgements from hardware commands, which are reported to the host but do not abort the message transmission.

The master-buffer-go bit(s) may be cleared by software to abort retry or pending master transactions. Hardware may only read the master-buffer-go before a retry operation or when in idle state.

If software attempts to clear the bit after a master operation has started, the transaction may not be aborted. In this case, hardware blocks the clearing of the master-buffer-go bit. Software may read the master-buffer-go bit and master-buffer-operation-done bits to determine whether the abort was performed. The master-buffer-go bit and master-buffer-operation-done bits may be located in the same register to allow software to read both bits.

In master receive mode, data is transferred from a slave to the master in ASIC 104. To initiate a master receive operation, the buffer configuration bits may be set and the remote slave address registers initialized. Setting the master-buffer-go bit starts the master receive operation. Software may read one buffer while receiving a message in the other buffer. Master transmit operations may not be pending or in progress before setting the master-buffer-go bit.

The sequence of which master-buffer-go bit is set determines which buffer is used in the event both bits are set before the start of the buffer access operation. The buffer with the first master-buffer-go bit set is used first.

Table 5 illustrates an exemplary master receive message format.

TABLE 5

Master Receive Message Format (Compliant)

| Transmitter | Data Location | Byte # | b7 | b6 | b5 | b4 | b3 | b2 | b1 | b0 |
|---|---|---|---|---|---|---|---|---|---|---|
| Master | slave addr | 0 | | | Slave Address | | | | | 1 |
| Slave | byte count | 1 | | | Byte Count | | | | | |
| Slave | hard wired | 2 | 0 | | Return Slave Address | | | | | |
| Slave | slave discrete i/o | 3 | 0 | | Discrete I/O Bit States | | | | | |
| Slave | slave hardware cmd | 4 | | Slave Last Hardware Command | | | | | | |
| Slave | slave status | 5 | pio 3 | pio 2 | pio 1 | pio 0 | bto | err | crc | buf |
| Slave | buffer | 6 | | | Data 0 | | | | | |
| Slave | buffer | 7 | | | Data 1 | | | | | |
| Slave | buffer | : | | | : | | | | | |
| Slave | buffer | k-3 | | | Data n-1 | | | | | |
| Slave | hw encoded | k-2 | | | CRC (lsb) | | | | | |
| Slave | hw encoded | k-1 | | | CRC (msb) | | | | | | where:
    buf=0, data transmitted from remote slave buffer(A)302
        =1, data transmitted from remote slave buffer(B)303
    crc=0, no hardware command CRC error
        =1, hardware command CRC error
    err=0, no error in hardware command
        =1, error in hardware command, invalid code or complement mismatch
    bto=0, byte timer not timed out
        =1, byte timer timed out
    pio[3:0] parallel I/O input states In the master receive operation, the I2C bus controller 100 transmits the slave address and read/write bit, and then switches to a receiver mode once the read/write bit is detected as set. After receiving the slave acknowledge, the I2C bus controller waits for the message byte count from the slave. The received byte count may be stored in the expected master-buffer-message-size byte count register.

An internal actual byte count counter 180 is cleared upon starting the master receive operation. The return slave address is then returned. This byte is compared to the corresponding remote slave address register and stored in the master-remote-hardware-status (mas_bufa_remote_stat or mas_bufb_remote_stat) register.

After the remote address, three slave hardware status bytes are received and stored in the master-remote-hardware-status register. The data bytes are then received. As each received data byte is acknowledged, the actual byte count is incremented. When the actual byte count equals the expected byte count, the CRC accumulation is stopped.

A byte count zero is valid. The master receiver does not interpret a zero byte count as a hardware command because only slave receivers are capable of decoding a hardware command message. If the byte count is zero, the slave controller continues the transmission by sending the byte count, return slave address, hardware status bytes, and CRC bytes.

Two subsequent CRC bytes may be received from the slave and then compared to the regenerated CRC value. Reception of the last CRC byte initiates a stop condition that ends the message and releases the bus. After the stop condition is asserted, the value of the internal actual transmit byte counter may be saved in the master-buffer-byte-counter registers for software inspection. The I2C bus controller may set the appropriate master-buffer-done bit, clear the appropriate master-buffer-go bit, generate an interrupt, and return to idle.

A non-compliant message format, such as that shown in Table 6, may be used for data transfers from a non-compliant slave transmitter to a compliant master receiver. The message format may not include the return slave address, byte count, slave hardware status and CRC bytes. Software may initialize the master receiver with the message byte count. The master receiver uses the byte count to terminate the end of message with a non-acknowledge to the slave receiver after the last byte. The slave receiver returns to idle upon detecting a non-acknowledge condition per I2C specifications.

TABLE 6

Non-Compliant Message Format

| Transmitter | Data Location | Byte # | b7 | b6 | b5 | b4 | b3 | b2 | b1 | b0 |
|---|---|---|---|---|---|---|---|---|---|---|
| Master | slave addr reg | 0 | | | Slave Address | | | | | 1 |
| Slave | buffer | 1 | | | Data 0 | | | | | |
| Siave | buffer | 2 | | | Data 1 | | | | | |
| Slave | buffer | : | | | : | | | | | |
| Slave | buffer | k-1 | | | Data n-1 | | | | | |

Hardware commands may not be decoded by the I2C bus controller 100 in the master receive operating mode. A zero byte count initiates a normal master receive transaction as described above, but without reception of any data bytes besides the return address, slave hardware status, and CRC bytes.

After an I2C start condition, arbitration may be lost anytime during the message stream. If arbitration is lost, excluding cases in which the I2C bus controller 100 receives a general call message or its own slave address, the I2C bus controller 100 may wait until the I2C bus 106 is clear and then re-arbitrate for the bus. If arbitration is lost and the I2C bus controller 100 detects its own slave address or a general call message, the I2C bus controller 100 may switch to slave mode. In either case, the buffer pointer may be reset to facilitate reinitiating the master receive transaction later.

After returning to idle state from the slave mode, the I2C bus controller 100 may redetect the master-buffer-go bit as set, in which case the master receive operation may be restarted. The arbitration retry count may be contained in the re-arbitration count register (R35). The count value may be cleared upon reset or by setting the soft register lstarb_count_rst bit.

In the master receive operating mode, the I2C bus controller 100 may handle errors such as non-acknowledgement, master operation abort, CRC error, and return slave address mismatch. For these error handling cases, the value of the internal actual byte counter may saved in the master-buffer-byte-counter register for software inspection.

If an acknowledge is not received after an address is transmitted, an I2C stop condition may be generated, and the appropriate "no acknowledge" bit (mas_bufa_noack or mas_bufb_noack) set. In this case, the master-buffer-go bit may be cleared, an interrupt generated, and the I2C bus controller may return to idle state.

The master-buffer-go bit(s) may be cleared by software to abort retry or in response to other pending master transactions. Hardware may inspect the master-buffer-go bit before a retry operation or when in the idle state. If software attempts to clear the bit after a master operation has started, the transaction may not abort. In this event, hardware blocks the clearing of the master-buffer-go bit. Software may read the master-buffer-go bit and master-buffer-operation-done bit to determine whether the abort was performed. The master-buffer-go bit and master-buffer-operation-done bits may be located in the same register to enable software to read both bits.

For each byte received that includes the slave address and byte count, a CRC may be performed and accumulated. When the actual byte count is equivalent to the expected byte count, the calculated CRC is compared to the received CRC. If a mismatch occurs, the mas_bufa_crc_fail or mas_bufb_crc_fail bit may be set and an interrupt generated.

The returned slave address and read/write bit may be compared against the address in the master remote slave address register. The master receiver may not acknowledge the next byte and generate a stop condition to abort the current operation in response to an address mismatch in order to ensure the slave releases the I2C data line. In this case, the mas_bufa_ret_addr_err or mas_bufb_ret_addr_err bit may be set, and interrupt generated, and the I2C bus controller 100 may return to the idle state.

The I2C bus controller 100 transmits data to an I2C master when in the slave transmit operating mode. There are two slave transmit buffers 307, 308. A slave transmit buffer may be enabled for transmission after software initializes the buffer and sets the appropriate slave transmit buffer validate bit. There is a transmit validate bit for each buffer. To resolve hardware/software race conditions, software normally clears one bit while setting the other bit in one register update operation to switch slave transmit buffers. If both validate bits are set, hardware transmits the message in buffer-A 303. A slave message transmit complete bit may be set for each buffer after transmitting the complete message.

When in the idle state, the I2C bus controller 100 may enter the slave transmit mode upon receiving its I2C slave address with the read/write bit set. The slave transmit operating mode may also be entered from the master transmit or master receive operating modes when arbitration is lost during the slave address transmission phase, the I2C bus controller 100 receives its own slave address, and the I2C read bit is set. An I2C acknowledge may be sent by the I2C core module 102 after the slave address is received and decoded true.

Two read response status (RRS) slave transmit buffers may normally used in a loose ping-pong fashion to resolve race conditions between simultaneous local host processor 112 write operations and I2C bus 106 read operations. The host may update the RRS message in one buffer while the slave transmitter concurrently reads and transmits from the other buffer. The host normally checks the rrs-bufer-enable (rrs_bufa_en and rrs_bufb_en) bits and the rrs-buffer-message-size (rrs_bufa_msg_size and rrs_bufb_msg_size) registers before writing the RRS message.

The expected slave transmit byte count contained in the rrs-buffer-message-size registers may be loaded into the internal actual slave transmit byte counter 180. A set rrs-bufer-enable bit indicates a particular RRS buffer has valid status to be transmitted upon demand by an I2C master receiver. After writing a new RRS message to the invalidated buffer (RRS enable bit cleared), the host processor 112 may simultaneously clear the current active buffer enable bit and set the new buffer enable bit.

After the I2C bus controller 100 receives a read response status message request, i.e., its own slave address and read/write bit set, the address may be acknowledged. The byte count may be transmitted and acknowledged by the master receiver. The RRS message transaction continues with transmission of the local slave address followed by the local hardware status bytes, which may be acknowledged by the master receiver. At this point, the internal slave transmit byte counter may be enabled to count the data bytes to be transmitted. The data bytes may then be fetched from the enabled RRS buffer and transmitted. The master receiver acknowledges the bytes transmitted to the slave.

A CRC-16 may be performed and accumulated for each byte transmitted in the message excluding the CRC bytes. When the actual byte count equals the expected byte count, the CRC bytes may be transmitted, least significant byte first. After the CRC bytes are acknowledged, the value of the internal byte counter may be saved into the actual slave read-response-buffer-byte-count register (rrs_bufa_byte_count or rrs_bufb_byte_count) for software inspection. The I2C bus controller may then set the read response status sent bit (rrs_bufa_sent or rrs_bufb_sent), generate an interrupt, and return to the idle state.

In the event both RRS transmit enable bits are cleared, the slave transmits the header bytes and may send zeros as data byte content. CRC accumulation may be performed and transmitted. If both RRS transmit enable bits are set after the I2C bus controller receives and acknowledges its own slave address, the I2C bus controller may transmit the message in slave buffer (A) 302 by default.

For non-compliant nodes, the message may be transmitted without the expected byte count, return slave address, discrete I/O bit states, slave last hardware command, slave status, and CRC bytes. For the non-compliant node, the master is in control and terminates the message transfer, unlike in the compliant mode where the slave plays a part in termination of the transmission. To terminate the transmission, the master may not acknowledge the last data byte received. This non-acknowledgment forces the slave to release the SCL and SDL upon which the master may assert a stop condition. Upon completion of the message transfer, an interrupt may be generated. In this case, the actual byte counter contains the number of bytes transmitted excluding the slave address.

For a non-acknowledgement condition, the appropriate rrs-buffer-no-acknowledge bit (rrs_bufa_noack or rrs_ bufb_noack) may be set, the actual slave read-response-buffer-byte-count register updated, and an interrupt generated. The I2C bus controller 100 may then return to the idle state.

The I2C bus controller 100 may receive data from an I2C master when in slave receive mode. When the I2C bus controller 100 is in the idle state, slave receive mode may be entered when the I2C bus controller 100 receives its slave address and the read/write bit is cleared. Slave receive mode may also be entered from the master transmit operating or the master receive operating mode when arbitration is lost during the slave address transmission phase, the slave address received by the I2C bus controller 100 is its own, and the read/write bit is set. An I2C acknowledge may be sent by the I2C core module after the slave address is received and decoded true.

Upon reset, hardware may be initialized to receive into slave receive buffer-A 302, and then ping-pong into buffer-B 303 and then buffer-A 302 again. A receive buffer lock bit may be set for each buffer. Software may clear these bits after reading the message to unlock the buffer. If both bits are set and another message received, the controller bit buckets the message and sets a slave receive buffer overrun bit. The bit bucketed message is not acknowledged by the slave.

After entering the slave receive operating mode, the I2C bus controller 100 may receive the byte count into the expected slave receive-message-size (rv_bufa_msg_size or rv_bufb_msg_size) register. The byte count may also be loaded into an internal expected byte counter 182. The internal actual byte counter 180 is cleared upon receiving a valid slave address. The byte count does not include the I2C slave address or CRC bytes.

If the byte count value is not zero, indicating that the message not a hardware command, the receive-buffer-lock (rv_bufa_lock and rv_bufb_lock) bits may be checked to determine whether any receive buffer is available. If a receive buffer enable bit is clear, indicating that the buffer available, the controller may select the buffer by setting the buffer lock bit, indicating that the buffer is busy. Subsequent bytes may be stored in the receive buffer. As each byte is stored, the internal actual byte counter is incremented. When the actual byte count equals the expected byte count, the I2C bus controller 100 expects the next two bytes to be the CRC value.

An I2C stop condition is expected after the CRC bytes. Once the stop condition has been asserted, the appropriate received-buffer-message bit (rv_bufa_msg or rv_bufb_msg) may be set and an interrupt generated. The contents of the actual byte counter may be saved in the actual slave receive-buffer-byte-count register (rv_bufa_byte_count or rv_bufb_byte_count) for software inspection.

The host processor 112 may clear the appropriate receive buffer lock bit after retrieving the message to unlock the buffer. In the event two received messages may be pending, the host may determine which message to retrieve first. If both receive buffers are locked, the slave does not acknowledge after receipt of the first byte, and the incoming message is lost. The current actual and expected byte counts may be retained until at least one buffer is unlocked.

A non-compliant slave may store the bytes following the slave address into the receive buffers and does not perform CRC accumulation on the data stream. The expected byte count is always zero. The master controls the transaction and may terminate the transmission by asserting a stop condition. Upon completion of the message transfer, an interrupt may be generated. In this state, the actual byte counter contains the number of bytes received excluding the slave address. The slave does not acknowledge if both receive buffers are locked and the incoming message is lost. For this case, the current message actual byte counts may be retained until at least one buffer is unlocked.

A message byte count with a zero value indicates a hardware command. The next two bytes are expected the hardware command and its complement. The I2C bus controller may store the hardware command byte into a hardware command (hw_cmd) register and the complement hardware command byte into the complement hardware command (hw_cmd_not) register.

After the hardware command bytes are received, the I2C bus controller 100 may assume the next two bytes are the CRC bytes (least significant byte first) and expect an I2C stop condition after the second CRC byte. All received bytes may be acknowledged.

The hardware command byte may be compared to the complemented hardware command. If the hardware command matches its complement hardware command byte, the command may be decoded by the hardware command decoder 150 and the appropriate discrete I/O bits set or cleared, or the appropriate action defined by the command taken. Once the stop condition is asserted, the receive hardware command (rv_hw_cmd) bit may be set and an interrupt generated.

In the slave receive operating mode, the I2C bus controller may handle errors such as a lost receive message, CRC error, and an error in hardware command byte. For these error handling cases, the value of the internal actual byte counter may be saved in the master-buffer-byte-counter register for software inspection.

If both receive buffers are unavailable and the incoming message is not a hardware command, then the receive message lost (rv_msg_lost) bit may be set and an interrupt generated. The incoming message may not be;acknowledged and lost.

For each byte received, a CRC may be performed and accumulated. When the actual byte count matches the expected byte count, the calculated CRC may be compared to the CRC embedded in the I2C message. In the case of a CRC mismatch, the appropriate receive-buffer-CRC-fail, (rv_bufa_crc_fail or rv_bufb_crc_fail) bit may be set for a data message, or the hardware-command-CRC-fail (hw_cmd_crc_fail) bit set for a hardware command message. Once the appropriate bit is set, an interrupt is generated.

The hardware-command-error (hw_cmd_err) bit may be set if the received hardware command does not match its complement or if the hardware command is an invalid code. The host processor 112 may be notified with an interrupt.

A number of embodiments have been described. Nevertheless, it will be understood that various modifications may be made without departing from the spirit and scope of the invention. Accordingly, other embodiments are within the scope of the following claims.

What is claimed is:

1. A method for handling communications between devices connected to an I2C bus, comprising:
   obtaining at least one message over an I2C bus; and
   performing a fail safe operation in response to messages transferred over the I2C bus at the devices connected to the I2C bus, said performing comprising:
   counting down a mute timeout period at a device connected to the I2C bus;
   restarting the timeout period in response to receiving a fail silent test message from the I2C bus; and
   disabling the device from transmitting messages to the I2C bus in response to the mute timeout period expiring;

counting down an unmute timeout period in response to the mute timeout period expiring; and in response to the unmute timer expiring, transmitting a fail silent test message from a first I2C interface to the I2C bus in a master mode, and enabling the transmitter.

2. A method for handling communications between devices connected to an I2C bus, comprising:

obtaining at least one message over an I2C bus; and performing a data transmission error detection operation in response to messages transferred over the I2C bus at the devices connected to the I2C bus, said performing comprising:

generating a first word having a first value in response to a component of a message, said component comprising an address, a byte count, and a plurality of data bytes;

transmitting said first word with the message;

generating a second word having the first value in response to the component of the message;

comparing the first word to the second word; and indicating an error in response to said first word not matching said second word.

3. The method of claim 2, further comprising performing a cyclic redundancy check.

4. The method of claim 2, further comprising performing a byte count check operation.

5. The method of claim 4, wherein said performing the byte count check operation comprises:

transmitting from a first device a message including a byte count indicative of a first number of data bytes in the message;

counting a second number of data bytes received in the message at a second device;

comparing the first number to the second number; and indicating an error in response to said first number not matching said second number.

6. The method of claim 2, further comprising:

performing a fail silent operation; and performing a data byte check operation.

7. An I2C bus controller adapted for connection to an I2C bus, said controller comprising:

a first I2C interface module having a first address;

a second I2C interface module having a second address;

a control unit connected to the I2C interface module, said control unit operative to perform a fail silent operation in response to messages transmitted over the I2C bus;

a mute timer operative to countdown a mute timeout period and to reset the mute timeout period in response to receiving a fail silent test message from the I2C bus;

an unmute timer operative to countdown an unmute timeout period in response to the mute timeout period expiring; and a transmitter operative to transmit messages from the controller to the I2C bus, wherein the control unit is operative to disable the transmitter in response to the mute timeout period expiring, and wherein the control unit is operative to transmit a fail silent test message from the first I2C interface module to the I2C bus in a master mode and to enable the transmitter in response to the unmute timer expiring.

8. The controller of claim 7, wherein the the control unit is further operative to perform a data transmission error detection operation, and wherein the control unit is operative to generate and include an error detection value in a message to be transmitted on the I2C bus and to decode an error detection value in a message received from the I2C bus.

9. The controller of claim 8, wherein the data transmission detection operation comprises a cyclic redundancy check, and wherein the error detection value comprises a cyclic redundancy value.

10. The controller of claim 7, further comprising performing a byte count check operation, said controller further comprising a byte counter to count data bytes in a message received from the I2C bus, wherein the control unit is operative to include a byte count value in a message to be transmitted on the I2C bus and to indicate an error in response to a byte count value in a message received from the I2C bus not matching a number of data bytes counted by the byte counter for said received message.

11. The controller of claim 7, wherein the control unit is operative to perform the fail silent operation in a first mode, and to not perform the fail silent operation in a second mode.

12. The controller of claim 7, wherein the control unit is further operative to perform:

a data transmission error detection operation; and a byte count check operation.

13. The controller of claim 7, wherein the controller is described in a hardware description language.

14. A system comprising:

an I2C bus; and a plurality of devices connected to the I2C bus, at least one of said devices comprising:

a first I2C interface module having a first address;

a second I2C interface module having a second address;

a mute timer operative to countdown a mute timeout period and to reset the mute timeout period in response to receiving a fail silent test message from the I2C bus;

an unmute timer operative to countdown an unmute timeout period in response to the mute timeout period expiring;

a transmitter operative to transmit messages from the controller to the I2C bus controller; and a control unit connected to the I2C interface module, said control unit operative to perform a fail silent operation in response to messages transmitted over the I2C bus, wherein the control unit is operative to disable the transmitter in response to the mute timeout period expiring, and wherein the control unit is operative to transmit a fail silent test message from the first I2C interface module to the I2C bus in a master mode and to enable the transmitter in response to the unmute timer expiring.

15. The system of claim 14, wherein the control unit is further operative to perform a data transmission error detection operation, and wherein the control unit is operative to generate and include an error detection value in a message to be transmitted on the I2C bus and to decode an error detection value in a message received from the I2C bus.

16. The controller of claim 15, wherein the data transmission detection operation comprises a cyclic redundancy check, and wherein the error detection value comprises a cyclic redundancy value.

17. The system of claim 14, wherein the control unit is further operative to perform a byte count check operation, said controller further comprising a byte counter to count data bytes in a message received from the I2C bus, and wherein the control unit is operative to include a byte count value in a message to be transmitted on the I2C bus and to indicate an error in response to a byte count value in a message received from the I2C bus not matching a number of data bytes counted by the byte counter for said received message.

18. The system of claim 14, wherein the control unit is further operative to perform:

a data transmission error detection operation; and a byte count check operation.

* * * * *